United States Patent
Scott et al.

(10) Patent No.: US 10,723,453 B2
(45) Date of Patent: Jul. 28, 2020

(54) FLYING WING VERTICAL TAKE-OFF AND LANDING AIRCRAFT

(71) Applicant: Sikorsky Aircraft Corporation, Stratford, CT (US)

(72) Inventors: Mark W. Scott, Bethany, CT (US); Colin Kemater Bunting, Guilford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 271 days.

(21) Appl. No.: 15/544,698

(22) PCT Filed: Nov. 19, 2015

(86) PCT No.: PCT/US2015/061705
§ 371 (c)(1),
(2) Date: Jul. 19, 2017

(87) PCT Pub. No.: WO2016/118230
PCT Pub. Date: Jul. 28, 2016

(65) Prior Publication Data
US 2018/0281942 A1    Oct. 4, 2018

Related U.S. Application Data

(60) Provisional application No. 62/105,985, filed on Jan. 21, 2015.

(51) Int. Cl.
*B64C 29/00* (2006.01)
*B64C 29/02* (2006.01)
(Continued)

(52) U.S. Cl.
CPC .............. *B64C 29/02* (2013.01); *B64C 25/04* (2013.01); *B64D 31/06* (2013.01);
(Continued)

(58) Field of Classification Search
CPC ........... B64C 3/56; B64C 11/28; B64C 27/22; B64C 27/26; B64C 27/28; B64C 27/50;
(Continued)

(56) References Cited

U.S. PATENT DOCUMENTS 4,071,206 A    1/1978   Magill
5,062,587 A *  11/1991  Wernicke ................ B64C 25/04
                                                   244/100 R
(Continued)

FOREIGN PATENT DOCUMENTS

EP    2397408 A2    12/2011
WO    2009066073 A1    5/2009

OTHER PUBLICATIONS

International Search Report and Written Opinion; International Application No. PCT/US2015/061705; International Filing Date:Nov. 19, 2015; dated Mar. 18, 2016; 14 Pages.
(Continued)

*Primary Examiner* — Richard R. Green
*Assistant Examiner* — Michael A. Fabula
(74) *Attorney, Agent, or Firm* — Cantor Colburn LLP

(57) ABSTRACT

A flying wing vertical take-off and landing (VTOL) aircraft includes an empennageless-fuselage from which foldable wings extend outwardly, an empennageless-nacelle supported on each of the wings and a rigid rotor propeller disposed on each empennageless-nacelle, each of the propellers being drivable to rotate about only a single rotational axis defined along a longitudinal axis of the corresponding empennageless-nacelle and being fully cyclically controllable.

13 Claims, 3 Drawing Sheets

(51) Int. Cl.
*B64C 25/04* (2006.01)
*B64D 31/06* (2006.01)

(52) U.S. Cl.
CPC .. *B64C 2201/028* (2013.01); *B64C 2201/048* (2013.01); *B64C 2201/088* (2013.01)

(58) Field of Classification Search
CPC ..... B64C 29/00; B64C 29/0091; B64C 29/02; B64C 39/024; B64C 2201/088; B64C 2201/102
See application file for complete search history.

(56) References Cited

U.S. PATENT DOCUMENTS

| | | | |
|---|---|---|---|
| 5,114,096 A * | 5/1992 | Wernicke | B64C 29/02 |
| | | | 244/45 A |
| 5,765,783 A * | 6/1998 | Albion | B64C 29/02 |
| | | | 244/17.23 |
| 6,659,394 B1 | 12/2003 | Shenk | |
| 6,981,844 B2 | 1/2006 | Perkinson et al. | |
| 8,434,710 B2 | 5/2013 | Hothi et al. | |
| 9,481,457 B2 * | 11/2016 | Alber | B64C 39/024 |
| 9,567,105 B2 * | 2/2017 | Alber | B64C 29/02 |
| 9,676,488 B2 * | 6/2017 | Alber | B64C 29/02 |
| 9,908,615 B2 * | 3/2018 | Alber | B64C 13/16 |
| 9,964,960 B2 * | 5/2018 | Fegely | G05D 1/0676 |
| 9,988,148 B2 * | 6/2018 | Alber | B64C 29/02 |
| 10,011,350 B2 * | 7/2018 | Scott | B64C 29/02 |
| 10,054,958 B2 * | 8/2018 | Creasman | B64C 3/546 |
| 10,077,108 B2 * | 9/2018 | Lauder | B64C 29/02 |
| 10,106,274 B2 * | 10/2018 | Alber | B64D 39/04 |
| 10,279,903 B2 * | 5/2019 | Bunting | B64D 45/04 |
| 10,287,013 B2 * | 5/2019 | Starace | G05D 1/0088 |
| 10,336,449 B2 * | 7/2019 | Alber | B64D 33/02 |
| 10,370,095 B2 * | 8/2019 | Won | B64C 27/26 |
| 2003/0062443 A1 | 4/2003 | Wagner et al. | |
| 2012/0286102 A1 | 11/2012 | Sinha et al. | |
| 2013/0119187 A1 | 5/2013 | Germanetti | |
| 2014/0231593 A1 | 8/2014 | Karem | |
| 2015/0284075 A1 * | 10/2015 | Alber | B64C 39/024 |
| | | | 244/12.4 |
| 2016/0009404 A1 * | 1/2016 | Newman | F02K 3/00 |
| | | | 701/3 |
| 2016/0046382 A1 * | 2/2016 | Alber | B64C 29/02 |
| | | | 701/3 |
| 2016/0304196 A1 * | 10/2016 | Alber | B64C 29/02 |
| 2016/0311553 A1 * | 10/2016 | Alber | B64D 39/04 |
| 2016/0375998 A1 * | 12/2016 | Scott | B64C 29/02 |
| | | | 244/7 B |
| 2017/0190412 A1 * | 7/2017 | Bunting | B64D 45/04 |
| 2017/0217585 A1 * | 8/2017 | Hulsman | B64C 39/024 |
| 2018/0312241 A1 * | 11/2018 | Alber | B64C 25/10 |

OTHER PUBLICATIONS

Johnsen FA. Sweeping forward: developing and flight testing teh Grumman X-29A, National Aeronautics and Space Administration, 2003. Retrieved from the internet:<URL:http://www.nasa.gov/sites/default/files/files/Sweeping_Forward.pdf>.

* cited by examiner

FLYING WING VERTICAL TAKE-OFF AND LANDING AIRCRAFT

CROSS REFERENCE TO RELATED APPLICATIONS

This application is a National Stage application of PCT/US2015/061705, filed Nov. 19, 2015, which claims the benefit of U.S. Provisional Application No. 62/105,985, filed Jan. 21, 2015, both of which are incorporated by reference in their entirety herein.

STATEMENT OF FEDERALLY SPONSORED RESEARCH AND DEVELOPMENT

This invention was made with government support with the United States Government under Contract No. HR0011-14-C-0010. The government therefore has certain rights in this invention.

BACKGROUND OF THE INVENTION

The subject matter disclosed herein relates to a vertical take-off and landing (VTOL) aircraft and, more particularly, to a flying wing VTOL aircraft.

Aircraft missions often require VTOL capability that is combined with long range and endurance and can be very demanding. Conventional configurations of such aircraft are designed primarily for efficient forward flight, for efficient vertical lift or a poor compromise solution. Alternatively, some configurations include tilt-wing or tilt-rotor features and have VTOL capabilities, long range and endurance but pay a high penalty in terms of complexity and higher empty weight. That is, a conventional tilt-wing aircraft carries an oversized fuselage for an inertial navigation system (IRS) and attack payloads.

A solution to the problem of tilt-wing aircraft being complex and heavy may involve the elimination of the fuselage and creation of a twin rotor flying wing VTOL configuration. However, utilizing conventional tilt-wing control architectures would require vertical and horizontal tails with respective elevator and rudder controls. These tails make folding the wings difficult and adversely affect stowage capability of the aircraft.

BRIEF DESCRIPTION OF THE INVENTION

According to one aspect of the invention, a flying wing vertical take-off and landing (VTOL) aircraft is provided and includes an empennageless-fuselage from which foldable wings extend outwardly, an empennageless-nacelle supported on each of the wings and a rigid rotor propeller disposed on each empennageless-nacelle. Each of the propellers is drivable to rotate about only a single rotational axis defined along a longitudinal axis of the corresponding empennageless-nacelle and is fully cyclically controllable.

In accordance with additional or alternative embodiments, each of the wings is a high aspect ratio wing in an unfolded condition.

In accordance with additional or alternative embodiments, each of the wings includes a forwardly swept trailing edge.

In accordance with additional or alternative embodiments, the aircraft further includes a hinge element disposed along each of the wings.

In accordance with additional or alternative embodiments, each of the hinge elements is proximate to the corresponding empennageless-nacelle.

In accordance with additional or alternative embodiments, each of the propellers includes a once-foldable rotor blade and a twice-foldable rotor blade.

In accordance with additional or alternative embodiments, each of the propellers includes a non-foldable rotor blade, two opposed once-foldable rotor blades and one twice-foldable rotor blade opposite the non-foldable rotor blade.

In accordance with additional or alternative embodiments, the aircraft further includes a landing gear element coupled to each empennageless-nacelle.

In accordance with additional or alternative embodiments, the aircraft further includes a truss element coupled to a trailing end portion of the fuselage sand additional landing gear elements coupled to opposite distal ends of the truss element.

According to another aspect of the invention, a flying wing vertical take-off and landing (VTOL) aircraft is provided and includes an empennageless-fuselage from opposite sides of which foldable wings extend outwardly, an empennageless-nacelle supported on each of the wings, a rigid rotor propeller disposed on each empennageless-nacelle and a flight computer. Each of the propellers is drivable to rotate about only a single rotational axis defined along a longitudinal axis of the corresponding empennageless-nacelle and is fully cyclically controllable. The flight computer is configured to control the driving of the rotation of each of the propellers and to cyclically control each of the propellers.

In accordance with additional or alternative embodiments, the aircraft further includes a hinge element disposed along each of the foldable wings proximate to the corresponding empennageless-nacelle.

In accordance with additional or alternative embodiments, each of the propellers includes a once-foldable rotor blade and a twice-foldable rotor blade.

In accordance with additional or alternative embodiments, each of the propellers includes a non-foldable rotor blade, two opposed once-foldable rotor blades and one twice-foldable rotor blade opposite the non-foldable rotor blade.

In accordance with additional or alternative embodiments, the aircraft further includes a landing gear element coupled to each empennageless-nacelle.

In accordance with additional or alternative embodiments, the aircraft further includes a truss element coupled to a trailing end portion of the fuselage and additional landing gear elements coupled to opposite distal ends of the truss element.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

As will be described below, a flying wing VTOL aircraft is provided and includes a rigid rotor system having full cyclic control. This allows for a flying wing VTOL aircraft that takes off vertically, and has the ability to transition to wing borne flight by simply pitching the cyclic control forward to thereby cause the entire flying wing VTOL aircraft to rotate from a vertical to a horizontal orientation. By discarding any special rotation actuation mechanisms, typical penalties of higher weight and added complexity are removed. In addition, the active proprotors have the added advantage of permitting an elimination of ailerons and evlerons from the wings thus leading to further reductions in weight and cost. Meanwhile, the aircraft enhances shipboard operations by elimination of the horizontal tail, elevator and rudder from the overall configuration as this allows the wings to be folded and the aircraft to be stowed in a limited spatial environment.

Figure 1:
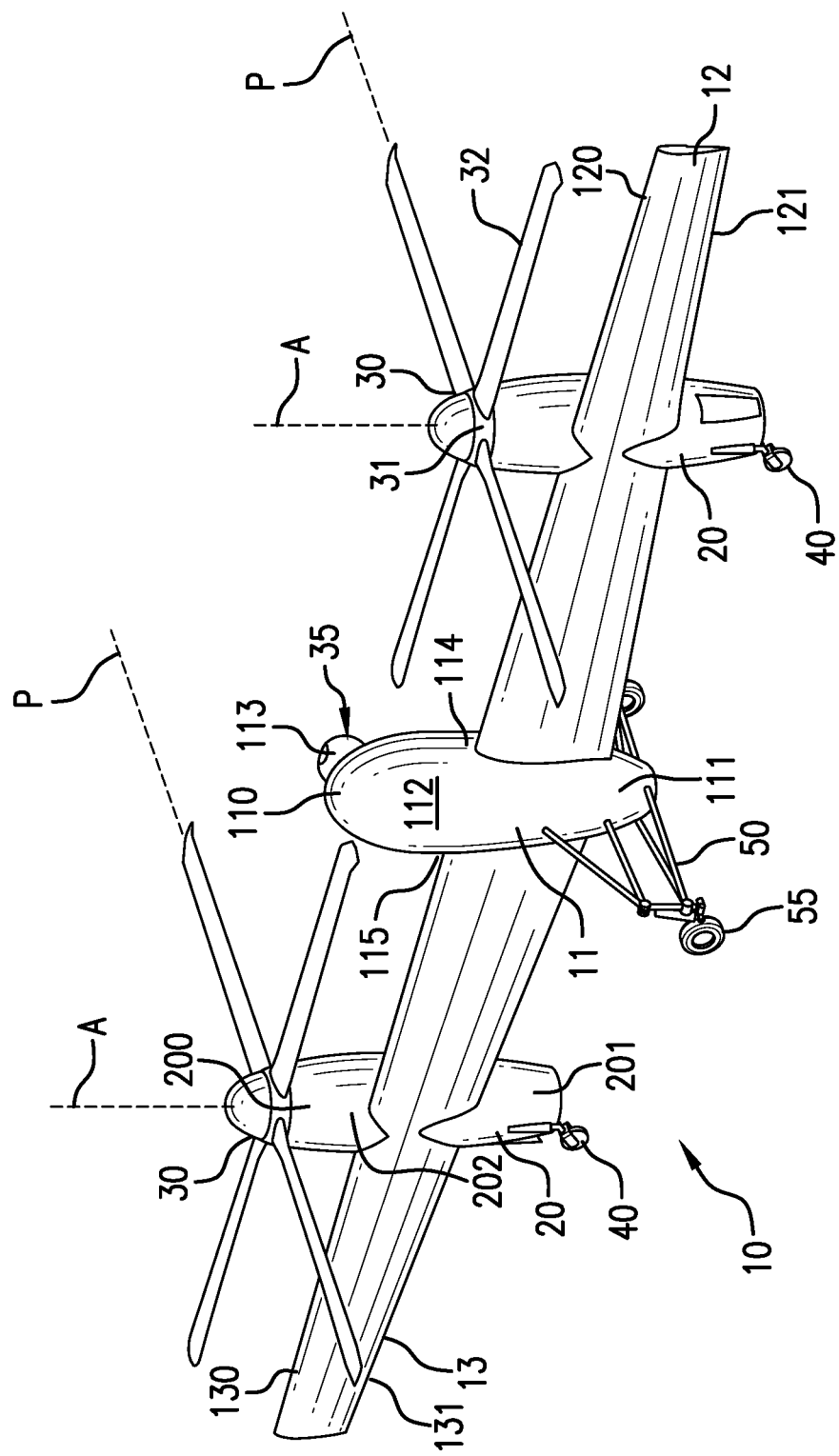
FIG. 1 is a perspective view of a flying wing VTOL aircraft in accordance with embodiments.
Figure 2:
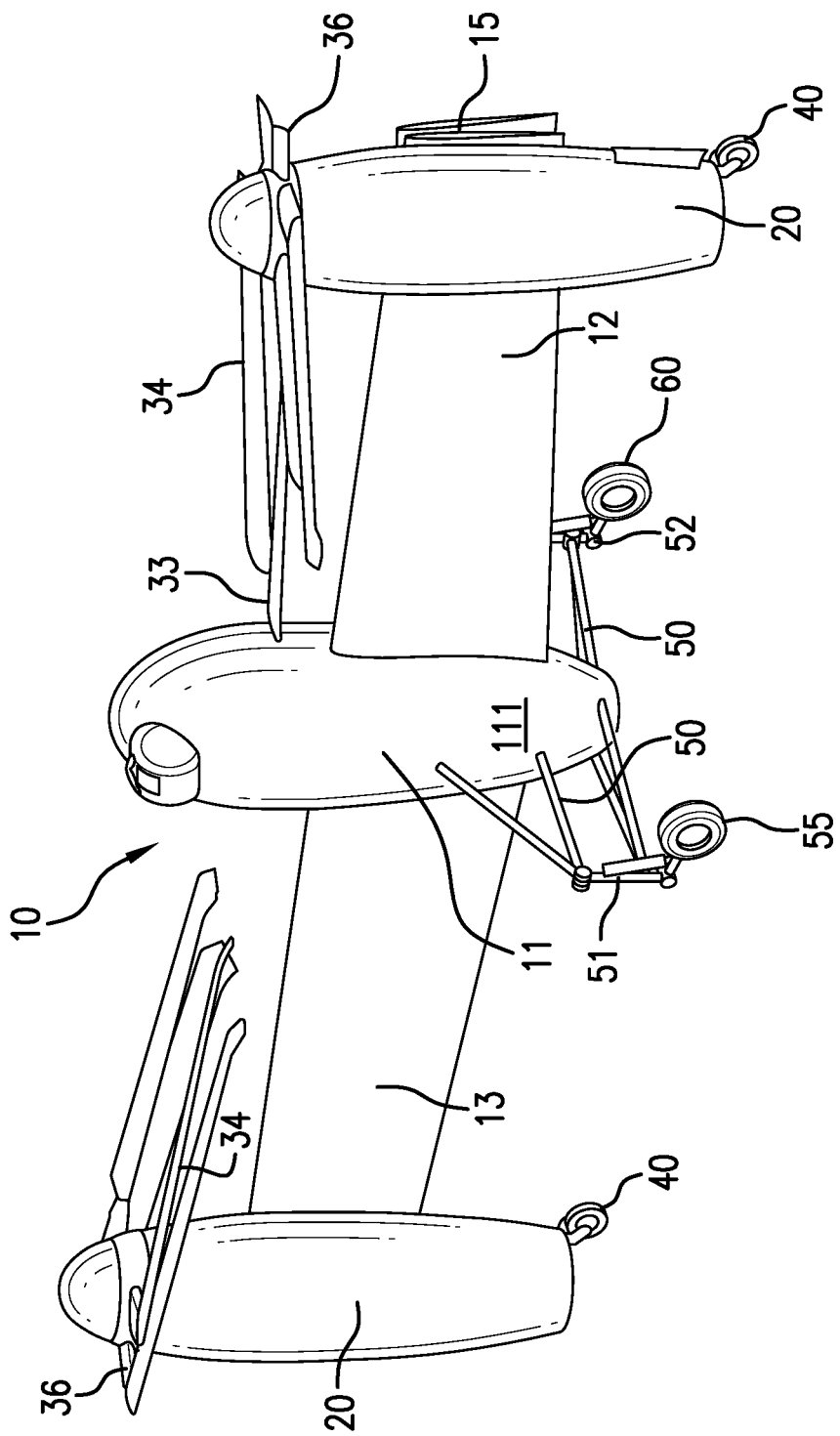
FIG. 2 is a perspective view of the flying wing VTOL aircraft of FIG. 1 in a folded condition.
Figure 3:
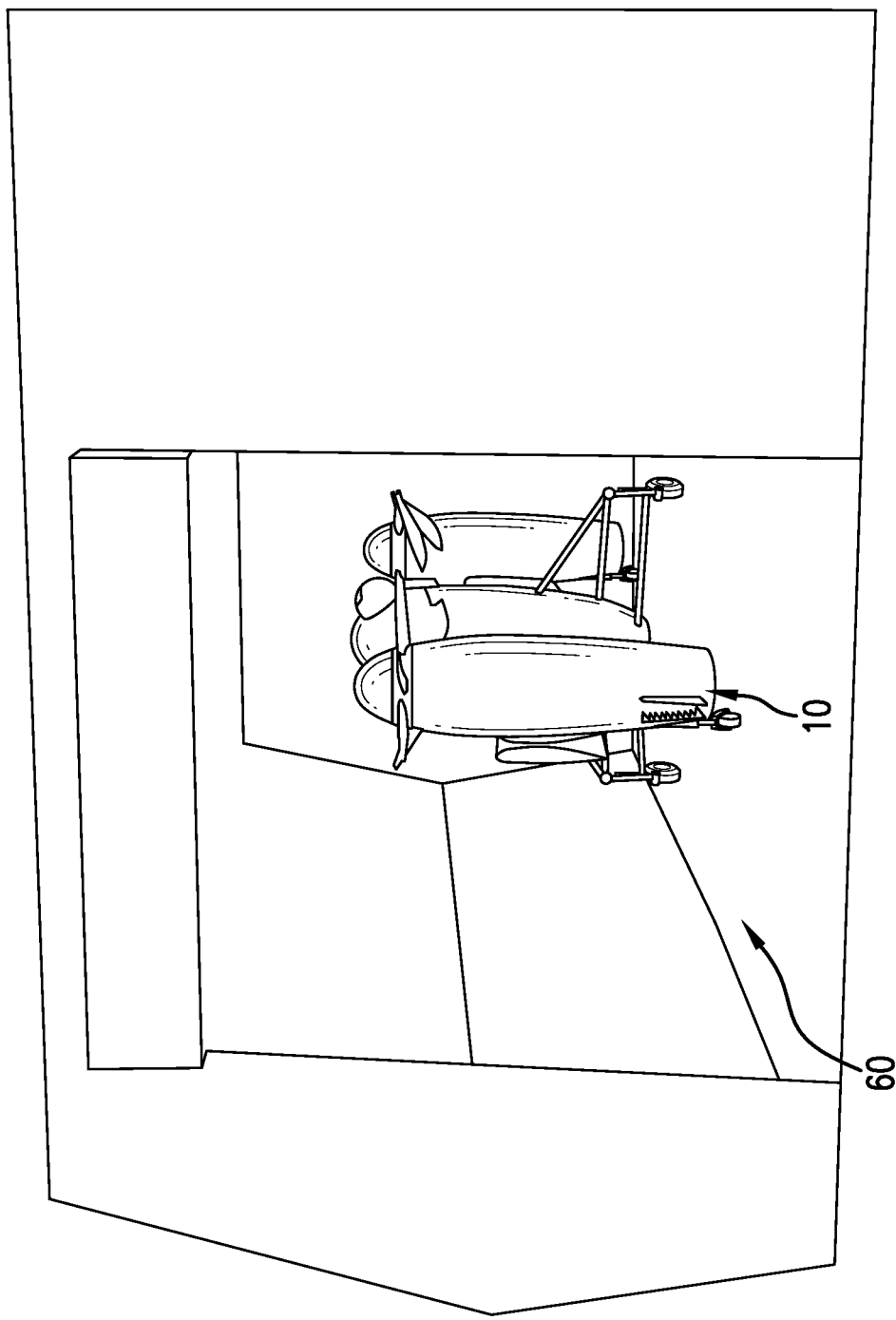
FIG. 3 is a perspective view of the flying wing VTOL aircraft of FIG. 2 in a stowed location.

With reference to FIGS. 1-3, a flying wing vertical take-off and landing (VTOL) aircraft 10 is provided. The aircraft 10 includes an empennageless-fuselage 11. The empennageless-fuselage 11 has an aerodynamic shape with a tapered nose section 110, a trailing end portion 111 opposite from the nose section 110 and an airframe 112. The airframe 112 is generally smooth but for a sensor component 113 disposed proximate to the nose section 110 and does not have a dorsal fin or horizontal or vertical stabilizer elements. The airframe 112 has first and second opposite sides 114 and 115 and is formed and sized to encompass at least one or more of an engine unit (e.g., a gas turbine engine or an electronic motor-generator), aircraft electronic components and payload elements.

The aircraft 10 further includes first and second foldable wings 12 and 13 that extend outwardly from the first and second opposite sides 114 and 115 of the airframe 112, respectively, hinge elements 15 (see FIGS. 2 and 3) disposed along each of the first and second foldable wings 12 and 13, an empennageless-nacelle 20 supported on each of the first and second foldable wings 12 and 13, a rigid rotor propeller 30 disposed on each empennageless-nacelle 20 and a flight computer 35.

The first and second foldable wings 12 and 13 are substantially similar in shape and size and are both foldable about the respective hinge elements 15 to assume unfolded (see FIG. 1) and folded (see FIGS. 2 and 3) conditions. When the first and second foldable wings 12 and 13 assume the unfolded condition, the first and second foldable wings 12 and 13 are configured as high aspect ratio wings. That is, in the unfolded condition, each of the first and second foldable wings 12 and 13 has a span or longitudinal length that substantially exceeds a chord where the span or longitudinal length is measured from the first and second opposite sides 114 and 115 to distal tips of the first and second foldable wings 12 and 13 and the chord is measured from the leading edges 120/130 to the trailing edges 121/131 of the first and second foldable wings 12 and 13. In accordance with embodiments, the leading edges 120/130 may be unswept and the trailing edges 121/131 may be forwardly swept.

In accordance with embodiments, when the first and second foldable wings 12 and 13 assume the folded condition, as shown in FIGS. 2 and 3, the distal tips may be pivoted about the hinge elements 15 such that they abut the main portions of the first and second foldable wings 12 and 13.

The empennageless-nacelles 20 are supported on each of the first and second foldable wings 12 and 13 at about a 40-60% span location. In accordance with embodiments, the hinge elements 15 may be proximate to the empennageless-nacelles 20. The empennageless-nacelles 20 have an aerodynamic shape with a forward section 200, a trailing end portion 201 opposite from the forward section 200 and a nacelle frame 202. The nacelle frame 202 is generally smooth and formed and sized to encompass at least one or more of an engine unit (e.g., a gas turbine engine or an electronic motor-generator), aircraft electronic components and payload elements.

The rigid rotor propellers 30 are disposed at the forward sections 200 on each empennageless-nacelle 20. Each of the rigid rotor propellers 30 is drivable to rotate about only a single rotational axis A, which is defined along and in parallel with a longitudinal axis of the corresponding empennageless-nacelle 20. Power required to drive the rotations of the rigid rotor propellers 30 may be generated from the engine units. Where the engine units are located remotely from one or both of the rigid rotor propellers 30 such as in a case where a single engine unit is located in the empennageless-fuselage 11 or in only one of the empennageless-nacelles 20, the aircraft 10 may further include a laterally oriented drive shaft for transmission of power generated by the gas turbine engine or electronic couplings running laterally along the aircraft 10 for transmission of power generated by the electronic motor-generator.

Each rigid rotor propeller 30 includes a hub 31 and rotor blades 32 that extend radially outwardly from the hub 31. As the rigid rotor propellers 30 are driven to rotate, the rotor blades 32 rotate about the rotational axes A and aerodynamically interact with the surrounding air to generate lift and thrust for the aircraft 10. The rotor blades 32 are also controllable to pitch about respective pitches axes P that run along their respective longitudinal lengths. Such rotor blade 32 pitching can be commanded collectively or cyclically by at least the flight computer 35, which may be embodied in the aircraft electronic components of one or more of the empennageless-fuselage 11 and the empennageless-nacelles 20. Collective pitching of the rotor blades 32 increases or decreases an amount of lift and thrust the rigid rotor propellers 30 generate for a given amount of applied torque. Cyclic pitching of the rotor blades 32 provides for navigational and flight control of the aircraft 10 as will be described below.

Particularly, each of the rigid rotor propellers 30 is fully cyclically controllable by at least the flight computer 35. This full cyclic control of the rigid rotor propellers 30 may be referred to as active proprotor control and permits the elimination of ailerons and evlerons from the aircraft 10, which leads to a further reduction in weight. In any case, the full cyclic control of the rigid rotor propellers 30 allows the aircraft 10 to take of and land vertically (i.e., with the node section 110 pointed upwardly) while permitting a transition to wing borne flight. Such transition is effected by simply pitching the cyclic control forward to thereby cause the entire aircraft 10 to rotate from a vertical orientation to a horizontal orientation.

In order to reduce a footprint of the aircraft 10, each of the rigid rotor propellers 30 may include a set of four rotor blades 32. Of these, one is a non-foldable rotor blade 33, two are opposed once-foldable rotor blades 34 and one is a twice-foldable rotor blade 36 that is disposed opposite the non-foldable rotor blade 33. As shown in FIGS. 2 and 3, when the aircraft 10 is grounded or not in flight, the first and second foldable wings 12 and 13, the once-foldable rotor blades 34 and the twice foldable rotor blades 36 may each assume their respective folded conditions. By contrast, when the aircraft 10 is prepped for flight conditions, the first and second foldable wings 12 and 13, the once-foldable rotor blades 34 and the twice foldable rotor blades 36 may each assume their respective unfolded conditions.

In addition to the features described above, the aircraft 10 may include a landing gear element 40 coupled to the trailing end portions 201 of each of the empennageless-nacelles 20, a truss element 50 and additional landing gear elements 55. The truss element 50 is coupled to the trailing end portion 111 of the empennageless-fuselage 11 and has first and second extended portions 51 and 52 that extend away from the empennageless-fuselage 11 in directions transverse to respective planes of the first and second foldable wings 12 and 13. The additional landing gear elements 55 are coupled to opposite distal ends of the first and second extended portions 51 and 52 of the truss element 50. When the aircraft 10 is grounded, the aircraft 10 is thus supported on the landing gear elements 40 and the additional landing gear elements 55, which cooperatively provide for a four-point stable support system that supports in the aircraft 10 against rolling over in any given direction.

As shown in FIG. 3, with the aircraft 10 in the grounded condition and the first and second foldable wings 12 and 13, the once-foldable rotor blades 34 and the twice foldable rotor blades 36 each assuming their respective folded conditions, the aircraft 10 may be stowed in a compartment of limited spatial size and dimension. Such a compartment may be provided as a hangar 60 on a naval ship that has substantial limits on available storage capacity. Thus, the ability of the aircraft 10 to assume a small footprint size without sacrificing flight capability is useful.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A flying wing vertical take-off and landing (VTOL) aircraft, comprising:
    an empennageless-fuselage from which foldable wings extend outwardly;
    an empennageless-nacelle supported on each of the wings;
    a rigid rotor propeller disposed on each empennageless-nacelle, each rigid rotor propeller being drivable to rotate about only a single rotational axis defined along a longitudinal axis of the corresponding empennageless-nacelle and being fully cyclically controllable; and
    a landing gear element coupled to each empennageless-nacelle.

2. The aircraft according to claim 1, wherein each of the wings is a high aspect ratio wing in an unfolded condition.

3. The aircraft according to claim 1, wherein each of the wings comprises a forwardly swept trailing edge.

4. The aircraft according to claim 1, further comprising a hinge element disposed along each of the wings.

5. The aircraft according to claim 4, wherein each of the hinge elements is proximate to the corresponding empennageless-nacelle.

6. The aircraft according to claim 1, wherein each rigid rotor propeller comprises:
    a once-foldable rotor blade; and
    a twice-foldable rotor blade.

7. The aircraft according to claim 1, wherein each rigid rotor propeller comprises:
    a non-foldable rotor blade;
    two opposed once-foldable rotor blades; and
    one twice-foldable rotor blade opposite the non-foldable rotor blade.

8. The aircraft according to claim 1, further comprising:
    a truss element coupled to a trailing end portion of the fuselage; and
    additional landing gear elements coupled to opposite distal ends of the truss element.

9. A flying wing vertical take-off and landing (VTOL) aircraft, comprising:
    an empennageless-fuselage from opposite sides of which foldable wings extend outwardly;
    an empennageless-nacelle supported on each of the wings;
    a rigid rotor propeller disposed on each empennageless-nacelle, each rigid rotor propeller being drivable to rotate about only a single rotational axis defined along a longitudinal axis of the corresponding empennageless-nacelle and being fully cyclically controllable;
    a flight computer configured to control the driving of the rotation of each of the propellers and to cyclically control each of the propellers; and
    a landing gear element coupled to each empennageless-nacelle.

10. The aircraft according to claim 9, further comprising a hinge element disposed along each of the foldable wings proximate to the corresponding empennageless-nacelle.

11. The aircraft according to claim 9, wherein each rigid rotor propeller comprises:
    a once-foldable rotor blade; and
    a twice-foldable rotor blade.

12. The aircraft according to claim 9, wherein each rigid rotor propeller comprises:
    a non-foldable rotor blade;
    two opposed once-foldable rotor blades; and
    one twice-foldable rotor blade opposite the non-foldable rotor blade.

13. The aircraft according to claim 9, further comprising:
    a truss element coupled to a trailing end portion of the fuselage; and
    additional landing gear elements coupled to opposite distal ends of the truss element.

* * * * *